G. YOUNG.
APPARATUS FOR AMUSEMENT OF THE PUBLIC.
APPLICATION FILED OCT. 6, 1910.
987,029.
Patented Mar. 14, 1911.
2 SHEETS—SHEET 1.
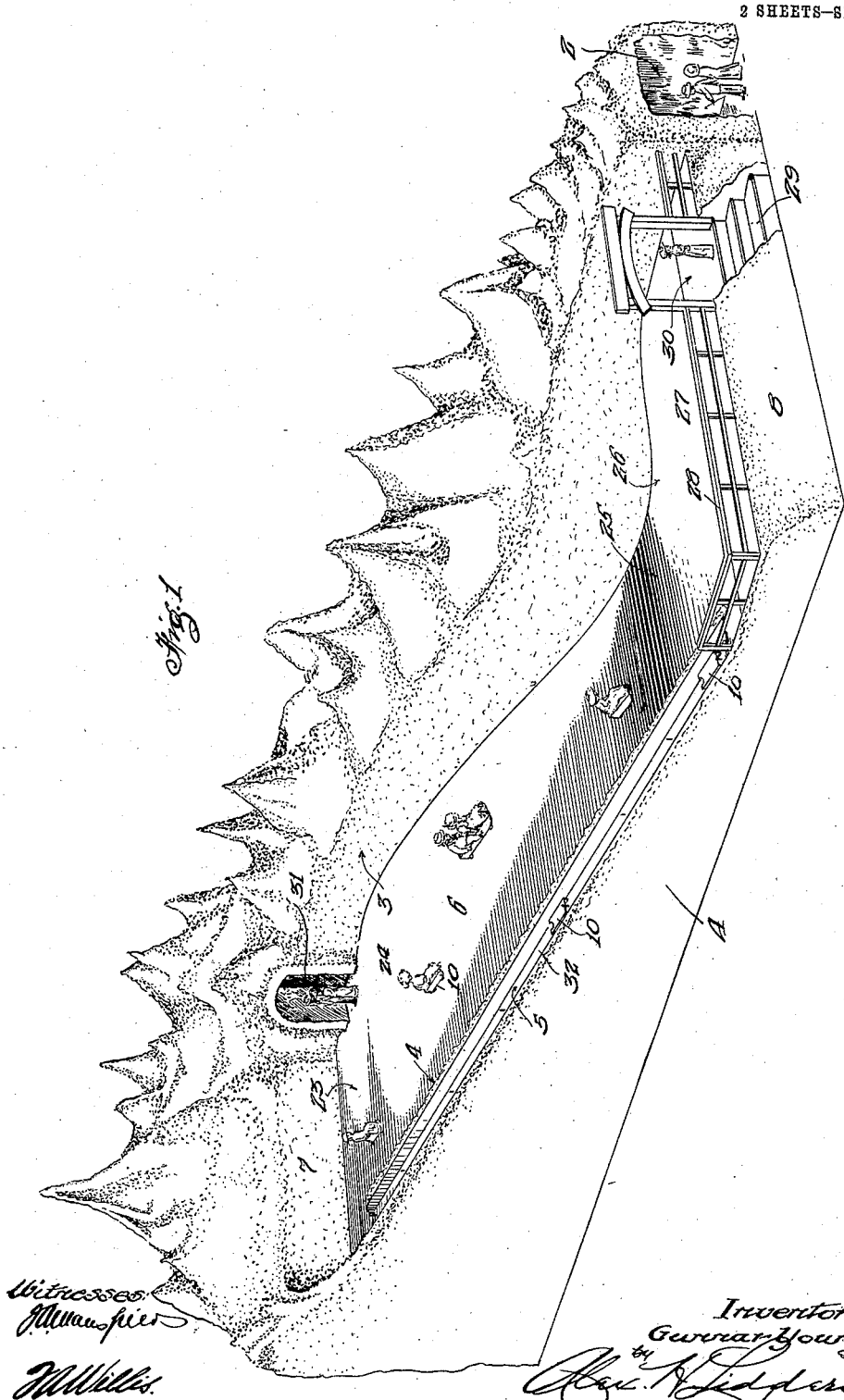

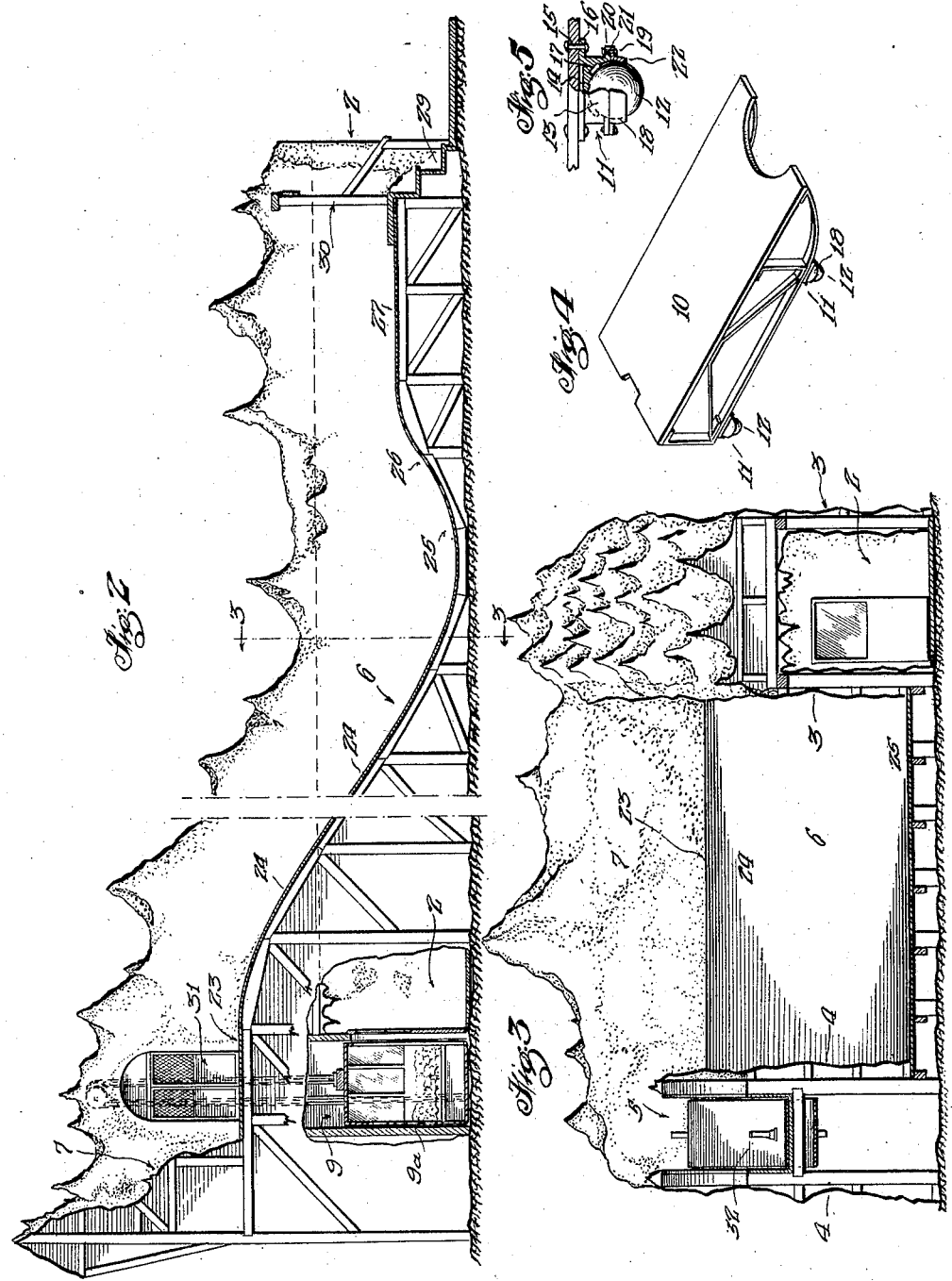

UNITED STATES PATENT OFFICE.

GUNNAR YOUNG, OF VENICE, CALIFORNIA.

APPARATUS FOR AMUSEMENT OF THE PUBLIC.

987,029.  Specification of Letters Patent.  Patented Mar. 14, 1911.

Application filed October 6, 1910. Serial No. 585,688.

*To all whom it may concern:*

Be it known that I, GUNNAR YOUNG, a subject of the King of Sweden, residing at Venice, in the county of Los Angeles, State of California, have invented a certain new and useful Apparatus for Amusement of the Public; and I do hereby declare the following to be a full, clear, and exact description of the invention, such as will enable others skilled in the art to which it appertains to make and use the same.

This invention relates to apparatus for amusement of the public, and it may be said to consist in the novel construction, arrangement and combination of parts and devices as will appear from the description and claims hereinafter.

Objects of the invention are to provide an apparatus of the class specified which shall be novel in character, attractive in appearance, safe and convenient for use by the public, and which shall furnish a novel kind of enjoyment to the public.

Other objects and the advantages of the invention will be apparent to those skilled in the art from a consideration of the following description of one form of construction of apparatus embodying the invention, taken in connection with the accompanying drawings, in which—

Figure 1 is a perspective view of the apparatus showing the roller sleighs which move on the smooth floor, which latter, intermediate of its level end portions which are on different levels, is shown to be declivitous and formed with a bend near its lower end portion, Fig. 2 is a partly broken away longitudinal section taken substantially centrally of the floor, Fig. 3 is a cross section taken in the vertical plane indicated by the line 3—3 in Fig. 2, Fig. 4 is a perspective view of one of the roller sleighs, and Fig. 5 is a partially broken away view of one of the roller mountings for the sleighs.

The framework structure may be of any approved character to provide for the gallery 2 substantially on the ground level, the front sloping bank 8, the inclined side 3 surmounting the gallery, and having thereon the chain of miniature mountains, the inclined side 4 having the runway 5 on the top thereof, the support for the broad, smooth floor 6 intermediate of the sides 3 and 4, and the rear wall 7 between the sides 3 and 4 and having thereon a continuation of the chain of miniature mountains which are on the side 3.

The walls of the interior of the gallery 2 may be of any suitable material but preferably such as is adapted for producing a grotto effect, and the sides 3 and 4, front bank 8, rear wall 7, and the miniature mountains may have thereon a covering of suitable material, but preferably of burlap or the like dipped in a solution of plaster of Paris or the like which is adapted to permit of being easily made to assume desired forms before the solution on the burlap dries and after drying becomes stiffened sufficiently to retain the desired forms. After the covering has dried out it may be given one or more coats of white paint or enamel or it may be otherwise treated to get, in effect, the appearance of snow on the covering.

At the rear of the gallery 2 may be provided a shaft 9 in which may be arranged the lift 9$^a$ which is adapted to carry patrons from the gallery 2 to the passageway 31 leading to the substantially level rear portion 23 of the floor 6 where the roller sleighs 10 are available for use by the patrons. The roller sleighs preferably consist of a sleigh of any approved form having mounted under the runners thereof, near the front and rear ends of the runners, a cage or retainer 11 in which is disposed to roll a ball 12. As shown the cage or retainer 11 may consist of a part 13 having a hemispherical socket 14 therein and which may be secured to the runner by bolts 15 passing through the flanges 16 on the part and passing through the runner of the sleigh. The part 13 may have channels or pockets 17 in the wall of the socket 14 to secure lightness and reduce friction. To the part 13 may be secured a part 18, preferably by bolts 19 passing through the flanges 20 and 21 on the parts respectively, which may extend a short distance below the part 13 and have its interior wall 22 curved spherically and lie in close proximity to the ball 12.

As will be understood, patrons may mount the roller sleighs 10 at the level rear portion 23 of the broad smooth floor 6 and be carried by said roller sleighs down at accelerated speed over the declivitous portion 24 of the floor and at retarded speed over the ascending slope 25 of the bend 26 in the floor and land at low speed on the substantially level front portion 27 of the floor;

the level front portion 27 of the floor being preferably about 4 feet above the level of the ground. The roller sleighs may be transported from the front portion 27 to the rear portion 23 of the floor by means of any suitable conveyer 32 extending therebetween and arranged in the runway 5.

Any suitable railing 28 may be provided at the top of the front sloping bank 8 and steps 29 may be provided leading from a gateway 30 in the railing to the ground.

It will be evident that various changes might be made in the apparatus as described, e. g., the gallery 2 may be inclined upwardly to permit of patrons walking from the ground level to and through the passageway 31 to the rear or upper portion of the floor 6, or, the conveyer 32 may be arranged in the gallery inclined as just mentioned and patrons may then mount the roller sleighs on the conveyer and be thereby carried to the upper portion of the floor 6, or, the declivitous portion of the floor 6 may have one or more bends or dips similar to, but comparatively smaller than, the bend 26.

I claim:

1. In apparatus of the class specified, the combination of a broad smooth floor, the rear and front portions of said floor substantially level and said floor having a portion thereof declivitous intermediate of said front and rear portions and having a bend therein near to said front portion, means for supporting said floor, inclined sides abutting said floor, one of said sides having a gallery therein and a chain of miniature mountains thereon, a wall between said sides near the rear ends thereof, said wall having thereon a chain of miniature mountains in continuation of the chain of mountains already mentioned, and a conveyer arranged in a runway on one of the said sides, substantially as described.

2. In apparatus of the class specified, the combination of a broad smooth floor, the rear and front portions of said floor substantially level and said floor having a portion thereof declivitous intermediate of said front and rear portions and having a bend therein near to said front portion, means for supporting said floor, inclined sides abutting said floor, one of said sides having a gallery therein and a chain of miniature mountains thereon, a wall between said sides near the rear ends thereof, said wall having thereon a chain of miniature mountains in continuation of the chain of mountains already mentioned, a conveyer arranged in a runway on one of the said sides, and a roller sleigh adapted to travel on said floor for moving patrons of the apparatus from the rear portion of the floor to the front portion thereof, substantially as described.

3. In an apparatus of the class specified, the combination of a framework structure, said structure formed to provide inclined sides, a broad support intermediate of said sides, a gallery in one of the sides, and a wall at the rear ends of said sides, a covering for the walls of the gallery adapted to provide a grotto effect, a whitish covering for said sides and said wall, a chain of miniature whitish mountains on one of said sides and on said wall, and a smooth floor on said broad support, said floor substantially level at the front and rear portions thereof, having a declivitous portion intermediate of said level portions, a bend near the said level front portion and means for conveying patrons of said apparatus from said gallery to the rear portion of said floor, substantially as described.

4. In an apparatus of the class specified, the combination of a framework structure, said structure formed to provide inclined sides, a broad support intermediate of said sides, a gallery in one of the sides, and a wall at the rear ends of said sides, a covering for the walls of the gallery adapted to provide a grotto effect, a whitish covering for said sides and said wall, a chain of miniature whitish mountains on one of said sides and on said wall, and a smooth floor on said broad support, said floor substantially level at the front and rear portions thereof, having a declivitous portion intermediate of said level portions, a bend near the said level front portion, and a conveyer in a runway on one of said sides, substantially as described.

5. In an apparatus of the class specified, the combination of a framework structure, said structure formed to provide inclined sides, a broad support intermediate of said sides, a gallery in one of the sides, and a wall at the rear ends of said sides, a covering for the walls of the gallery adapted to provide a grotto effect, a whitish covering for said sides and said wall, a chain of miniature whitish mountains on one of said sides and on said wall, and a smooth floor on said broad support, said floor substantially level at the front and rear portions thereof and having a declivitous portion intermediate of said level portions, a bend near the said level front portion, and a roller sleigh adapted to travel on said floor for carrying patrons of the apparatus from the rear portion of the floor to the front portion thereof, substantially as described.

6. In an apparatus of the class specified, the combination of a framework structure, said structure formed to provide inclined sides, a broad support intermediate of said sides, a gallery in one of the sides, and a wall at the rear ends of said sides, a covering for the walls of the gallery adapted to provide a grotto effect, a whitish covering for said sides and said wall, a chain of miniature whitish mountains on one of said sides and on said wall, and a smooth floor on said broad support, said floor substantially level at the front and rear portions thereof and having a declivitous portion intermediate of said level portions, a bend near the said level front portion and means for conveying patrons of said apparatus from said gallery to the rear portion of said floor, a conveyer in a runway on one of said sides, and a roller sleigh adapted to travel on said floor for carrying patrons of the apparatus from the rear portion of the floor to the front portion thereof, substantially as described.

In testimony whereof, I have signed my name to this specification in the presence of two subscribing witnesses at Los Angeles, county of Los Angeles, State of California, this 30th day of September A. D. 1910.

GUNNAR YOUNG.

Witnesses:
FRED A. MANSFIELD,
ALEX. H. LIDDERS.

Copies of this patent may be obtained for five cents each, by addressing the "Commissioner of Patents, Washington, D. C."